United States Patent
Lau et al.

(10) Patent No.: US 6,996,469 B2
(45) Date of Patent: Feb. 7, 2006

(54) METHOD OF ROUTE CALCULATION AND METHOD OF NAVIGATION

(75) Inventors: Stefan Lau, Giesen (DE); Thomas Jung, Frankfurt (DE); Heinrich Schmidt, Diekholzen (DE); Ralf Hoffmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 10/258,337

(22) PCT Filed: Apr. 19, 2001

(86) PCT No.: PCT/DE01/01505

§ 371 (c)(1),
(2), (4) Date: Jun. 9, 2003

(87) PCT Pub. No.: WO01/79786

PCT Pub. Date: Oct. 25, 2001

(65) Prior Publication Data

US 2004/0021583 A1 Feb. 5, 2004

(30) Foreign Application Priority Data

Apr. 19, 2000 (DE) .......................... 100 19 407

(51) Int. Cl.
*G08G 1/09* (2006.01)
*G01C 21/34* (2006.01)

(52) U.S. Cl. .............. 701/210; 701/205; 701/209; 340/995.21; 340/995.23

(58) Field of Classification Search ............... 701/210, 701/205, 209; 340/995.21, 995.23
See application file for complete search history.

(56) References Cited

U.S. PATENT DOCUMENTS 5,842,142 A  *  11/1998  Murray et al. ............... 701/16

FOREIGN PATENT DOCUMENTS

| DE | 19839193 | 3/2000 |
|---|---|---|
| JP | 10089992 | 4/1998 |
| JP | 11094576 | 4/1999 |
| JP | 200046573 | 2/2000 |

* cited by examiner

*Primary Examiner*—William A. Cuchlinski, Jr.
*Assistant Examiner*—Olga Hernandez
(74) *Attorney, Agent, or Firm*—Kenyon & Kenyon

(57) ABSTRACT

A method of route calculation in an vehicle navigation device is described, whereby a route from a starting location or a current location to a destination location is calculated, so that in the case of a deficiency in the vehicle or a deficiency impairing the driver of the vehicle, the route to an alternate destination location which has facilities for eliminating the deficiency is calculated instead of the original destination location. In addition, a method of navigation of a driver of a vehicle from a starting location to at least one destination location is also described, a trip route from the starting location or a current location to the at least one destination location being determined, and driving instructions being generated as a function of a current location so that in the case of a deficiency in the vehicle or a deficiency impairing the driver of the vehicle, the trip route to an alternate destination location which has the facilities for eliminating the deficiency is calculated.

10 Claims, 2 Drawing Sheets

METHOD OF ROUTE CALCULATION AND METHOD OF NAVIGATION

FIELD OF THE INVENTION

The present invention is directed to both a method of route calculation in a vehicle navigation unit, whereby a route from a starting location or from a current location to a destination location is calculated, and also to a method of navigating the driver of a vehicle.

BACKGROUND INFORMATION

Navigation devices have been used in motor vehicles in particular. Using such devices, after input of a navigation destination, a trip route from a starting location or a current vehicle location to the navigation destination may be calculated with the assistance of stored map information, and the driver of a vehicle may be guided to the navigation destination during a trip by driving instructions generated as a function of the particular current vehicle location.

SUMMARY OF THE INVENTION

According to an example embodiment of the present invention, in the case of a deficiency in the vehicle or a deficiency impairing the driver of the vehicle, a route to an alternate destination is calculated instead of the original destination, and this route is used as the basis for guidance to the destination. This has the advantage that the driver of the vehicle is relieved from having to conduct a manual search for alternate destinations, e.g., on the basis of a road map that is also brought along. This may be important in particular because conventional road maps may either not contain notation regarding alternate destinations in the sense of the present invention, such as parking places, highway rest areas, facilities available at these alternate destinations, overnight facilities, restaurants and so forth, or such information is accessible only through a concentrated study of the map. The example embodiment of the present invention thus allows reduced distraction of the driver of the vehicle from traffic on the road and thus increases traffic safety. It is therefore not necessary to bring along a separate map.

According to an embodiment of the present invention, for the selection of an alternate destination, the driver of the vehicle may specify certain attributes such as certain additional facilities, brand name affiliation or the like for possible acceptance of an alternate destination and the facilities available there due to a vehicle deficiency or an impairment affecting the driver himself. For example, an interruption in the trip, which may be necessary for filling up the tank of the vehicle, may be utilized to advantage for provisions for the driver of the vehicle. Thus, the number of required interruptions in a trip may be reduced.

According to another embodiment of the present invention, in the case of a deficiency in the vehicle or a deficiency which impairs the driver of the vehicle, one or more alternate destinations may be suggested to the driver of the vehicle. This provides the advantage that the driver of the vehicle is not surprised or confused by the navigation to an intermediate destination which does not match the destination he has selected. By accepting the suggested destination, the driver of the vehicle may be relieved of the burden of making an additional manual input of the alternate destination as a new trip destination. In addition, according to an advantageous embodiment of the present invention, the original destination may still be available as a destination even after acceptance of the alternate destination after having driven to it. Thus, the driver of the vehicle is relieved of the burden of entering another destination.

It is also advantageous if the driver of the vehicle is notified of the deficiencies found, so that the driver is informed of the reason for navigating to the alternate destination. Also, after arrival at the alternate destination the driver may perform or have performed measures suitable for elimination of the deficiency found.

Another embodiment of the present invention provides for a possibility for the driver having an influence on the selection of an alternate destination for the route calculation and navigation. This prevents the driver of the vehicle imposing his own will which could mislead the driver to ignore the driving instructions of the navigation device to an increasing extent. This increases the acceptance of the navigation device by the driver. Such influence may be implemented by having the route to the selected alternate destination calculated instead of the original destination only after acceptance of the alternate destination or one of the plurality of alternate destinations by the driver of the vehicle or by having the route to the alternate destination suggested calculated instead of the original destination if the driver of the vehicle does not reject the alternate destination.

The detection of a deficiency in the vehicle may be performed using conventionally-provided automotive sensors to generate warning signals for the case of a deficiency such as a declining supply of fuel, imminent engine damage due to overheating, etc. The finding of a deficiency impairing the driver of the vehicle is advantageously made by biosensors or by a corresponding input by the driver of the vehicle via the input unit of the navigation device.

It is also of particular advantage if the availability of the facilities required to eliminate the deficiency in the vehicle or the deficiency impairing the driver of the vehicle at a potential alternate destination is checked by a comparison of the current time of day with stored official business hours or by remote inquiry. Thus, the availability of resources may depend on the current time of day or the supply of spare parts or fuel available at a potential alternate destination. The check on the availability of the resources is advantageously performed automatically to relieve the driver of the vehicle and in particular the remote inquiry may also be initiated automatically via a wireless interface with access to stored telephone numbers or other stored addresses.

DETAILED DESCRIPTION

Figure 1:
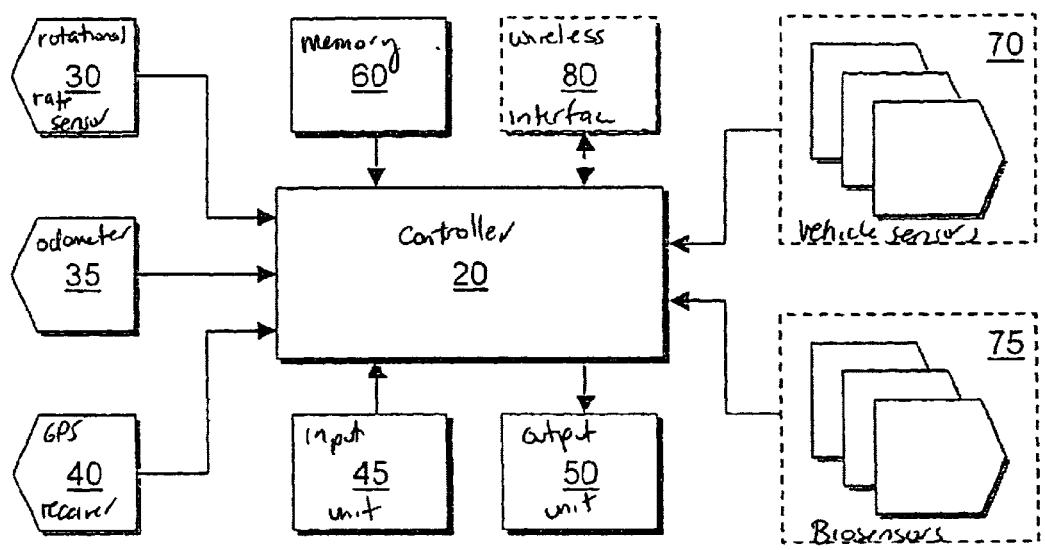
FIG. 1 shows a block diagram of the part of a navigation device according to the present invention.

FIG. 1 shows a block diagram of a navigation device 10 according to the present invention.

Means 30, 35, 40 which provide information regarding the location, the direction of movement, and the movement status of the vehicle, are connected to a device controller 20 of navigation device 10 which also includes the actual navigation computer.

In the present exemplary embodiment, a rotational rate sensor 30 detects the orientation of the vehicle in which the navigation device is installed with respect to the cardinal directions by integration over the detected changes in rotational rate. In addition, the navigation device 10 includes an odometer 35 which detects pulses delivered by wheel sensors of an ABS system for automotive brakes, for example, and determines the distance traveled from the pulse count thus detected and a known wheel circumference. Navigation device 10 also includes a GPS (global positioning system) receiver 40 for receiving and analyzing radio signals emitted by GPS satellites on the basis of which the position of the vehicle is discernible.

In addition, a memory 60 in which information from a road map is stored in digital form is also connected to controller 20. In the present exemplary embodiment, memory 60 is implemented in the form of a CD-ROM drive into which a CD-ROM is inserted as the data carrier of the road map information. Likewise, however, it is also possible for memory 60 to be implemented in the form of a RAM or ROM semiconductor memory. In conjunction with the present invention, the memory holds not only the pure traffic route information such as highways, national, state and local roads and inner city roads but also information regarding gas stations, repair shops and rest stops, facilities with restrooms, restaurants and telephones. In the case of repair shops and gas stations, information regarding their brand affiliation and whether they are authorized repair shops of certain makes of vehicles may also be stored in the memory. Furthermore, in conjunction with roads on which it is possible to drive in only a certain direction such as one-way roads and highways together with rest stop information it is also possible to store direction information indicating whether a certain highway rest stop, for example, is reachable at all with a given direction of travel on a certain highway. According to another advantageous embodiment of the present invention, information regarding official business hours of certain resources and/or addresses available at a certain location such as telephone numbers is also stored in memory 60 for contacting them via a mobile wireless telephone, for example, or a mobile Internet access.

In addition, an output unit 50, which may be a display device in the present case, is connected to controller 20. During the actual navigation operation, driving instructions for the driver of the vehicle may be displayed on this device, e.g., in the form of a directional arrow for imminent turning maneuvers and a remaining distance display to the turn. Likewise, however, it is also possible for output unit 50 to include an acoustic output device in addition to or as an alternative to the visual display so that acoustic driving instructions such as "turn right after 100 meters" or the like may be output.

Furthermore, an input unit 45 having operating elements (not shown) such as push buttons or other input means, e.g., rotary knobs, is connected to controller 20 for input of a navigation destination point and for operation of other functions of the device. Input unit 45 is also used, as described below, to preselect user-defined preferences for the selection of alternate destinations such as preselection of preferred petroleum companies for the case when due to a declining supply of operating fuel it is necessary to go to a gas station before the end of the trip or, for example, preselection of certain facilities of a highway rest stop, e.g., a restaurant, so that in the event that it is necessary to interrupt the trip to tank up or replenish the fuel supply, this interruption may also be used for obtaining provisions at the same time.

Automotive sensors 70 for detecting operating states of the vehicle, in particular for detecting a deficiency in the vehicle, and biosensors 75 for detecting a deficiency impairing the driver of the vehicle are also connected to controller 20. Automotive sensors 70 include, for example, a sensor for fuel reserves, such as a filling level meter for a fuel tank in the case of a vehicle driven by an internal combustion engine, a sensor for a lubricant supply and a sensor for a coolant supply and also a tire pressure sensor, for example. These automotive sensors 70 may be designed so that they deliver a measured variable corresponding to the parameter measured, such as the reserve quantity of fuel or the tire pressure, and this measured variable is then compared in controller 20 with a threshold value such as a minimum reserve fuel level or a minimum tire pressure, to form a signal indicating the automotive deficiency. The signals of automotive sensors 70 may be polled at regular intervals by controller 20 to check on the parameters to be monitored, so that a deficiency which is manifested gradually such as a decline in supply of fuel is detected promptly and may be taken into account in determining an alternate location. In an alternative embodiment, certain sensor signals may also be called up by controller 20 when on the basis of certain circumstances, e.g., the distance traveled after the last filling of the vehicle gas tank, the development of a deficiency is to be expected, e.g., a decline in the supply of fuel.

As an alternative, vehicle sensors 70 may perform an analysis of the measured variables and in the case of a deficiency in the vehicle they may deliver a signal indicating this deficiency to the controller. Biosensors 75 usually include a pulse meter, a skin surface resistance meter, or some other sensor suitable for detecting the physical condition of the driver of the vehicle. Biosensors 75 are used to generate a signal indicating an impairment in the condition of the driver of the vehicle such as excess fatigue or excessive stress on the driver.

According to an advantageous refinement of the present invention, a wireless interface 80, which may be implemented as a mobile wireless telephone or a radio device may be connected to controller 20.

Controller 20 may be designed in the form of a program-controlled microprocessor for implementation of the sequences and calculations required as part of a route calculation and/or trip navigation by an vehicle navigation device. In particular, the controller performs the sequences input of a destination name selected by the driver of the vehicle via input unit 45 in addition to controlling the destination input, e.g., through a plausibility check of a place name or a place name component that has been input by comparing it with place names contained in memory 60, assigning coordinates to the specified destination on the basis of the map data stored in memory 60, determining the current location of the vehicle from the position data supplied by the rotational rate sensor, the odometer and the GPS receiver or data suitable for calculating the position, calculating a trip route from the current location of the vehicle to the destination specified by the user or otherwise on the basis of the map data stored in memory 60, comparing the current position of the vehicle with significant points located on the calculated route, in particular turns, generating driving instructions for navigating the driver of the vehicle on reaching significant points located on the route, comparing the current position of the vehicle with the calculated trip route to ascertain any possible deviation in the vehicle position from the trip route due to failure to follow driving instructions or an unforeseen turn, and if necessary recalculating the trip route.

In conjunction with the present invention, controller 20 also performs the following functions:

entering preferences input via input unit 45 for an alternate destination to be driven to instead of the original trip destination input in the case of a deficiency found in the vehicle or an impairment in the driver of the vehicle, regular polling of the sensor signals for predicting a deficiency in the vehicle which develops gradually, ascertaining a deficiency in the vehicle on the basis of the signals generated by automotive sensors 70 and/or biosensors 75 and informing the driver of the vehicle of the deficiencies thus ascertained, determining an alternate destination suitable for eliminating a deficiency ascertained, if necessary, taking into account the preferences preselected by the driver of the vehicle, and if an alternate destination having the selected properties is not reachable at all or not within a predetermined period of time or trip distance, determining an alternate destination, determining the availability of the alternate destination or the resources of the alternate destination required to eliminate the deficiency found, e.g., by comparing the current time of day with, for example, the official business hours of certain resources stored in memory 60 or by remote inquiry as to the availability of the resources via the wireless interface, calculating a trip route from the current location of the vehicle to the alternate destination, if this has been accepted by the driver of the vehicle or if driving to the suggested alternate destination is indicated because of the prevailing deficiency, navigation to the alternate destination and navigation to the original destination preselected by the driver of the vehicle as soon as the deficiency found has been eliminated.

Figures 2A, 2B:
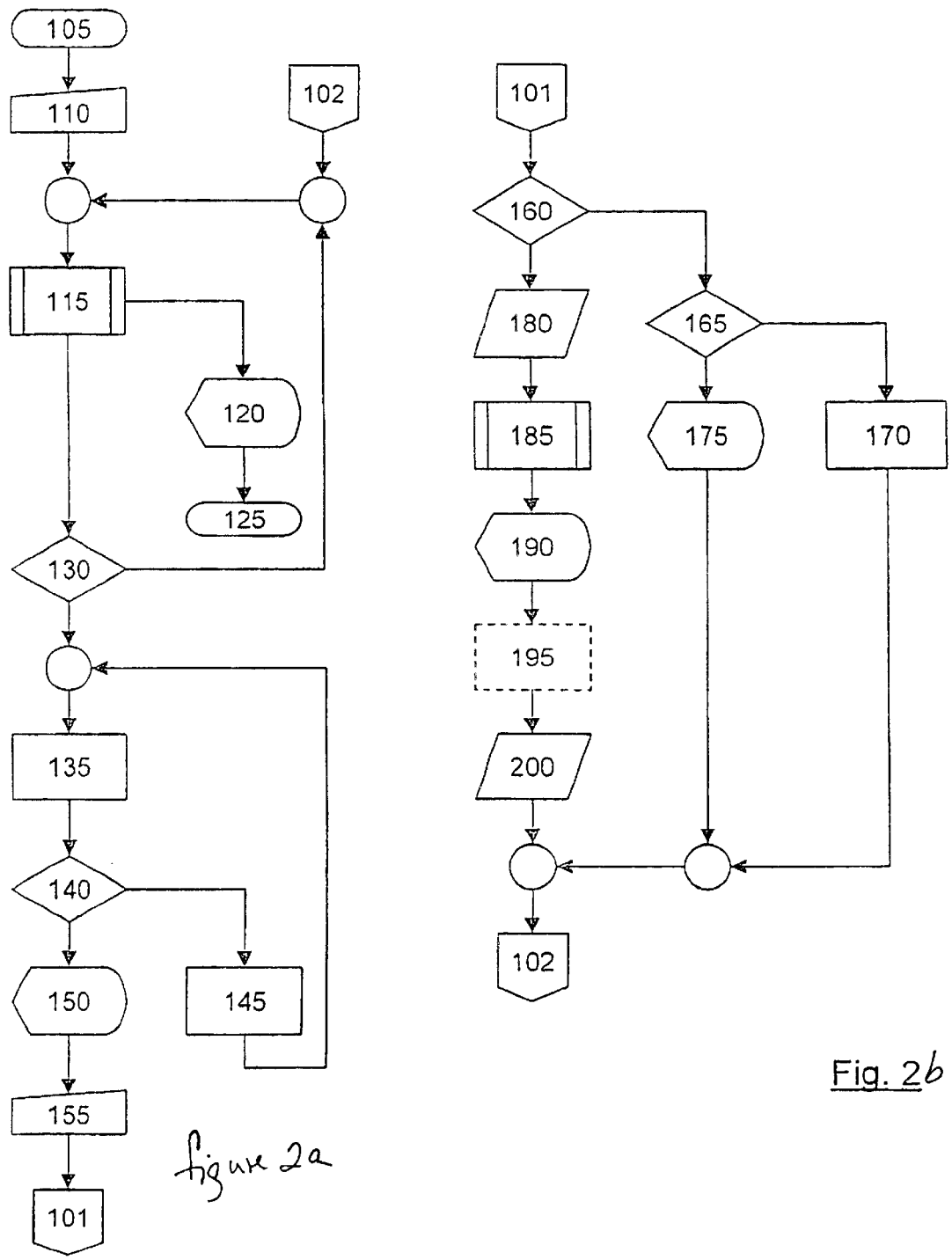
FIGS. 2a and 2b show a flow chart of the methods according to the present invention.

In FIGS. 2*a* and 2*b*, the sequence according to the present invention begins with turning on navigation device 10, e.g. when turning on the vehicle ignition (step 105). After turning on navigation device 10, the driver of the vehicle is requested to input a navigation destination. Input of the destination location (step 110) is performed in a conventional manner by input of the name of the location or city of the navigation destination on input unit 45, e.g., by sequential input of the letters of the name of the destination by scrolling through the alphabet. e.g., by using a rocker key or a rotary knob and confirmation of each letter selected and by subsequent analogous input of a street name and, if necessary, a house number of the navigation destination.

Input of the destination location may be supported, for example, by controller 20 in the form of a speller, so that the only letters available for the letter input are those which in combination with letters previously input yield a part of a valid place or street name contained in the memory. In addition, one or more of a plurality of suitable place names may be suggested in a list for selection for a sequence of letters that have been input.

In addition, if desired by the driver of the vehicle, preferences for one or more (depending on the deficiencies) alternate destinations which have facilities suitable for elimination of the deficiencies may also be preselected by using input unit 45. For example, for the case when the vehicle must go to the repair shop, a certain vehicle make may be preselected; for the case when the gas tank of the vehicle must be filled up, a certain petroleum company may be preselected or certain facilities of a highway rest stop, e.g., with a restaurant, may be preselected so that an interruption in the trip which is necessary for filling up the vehicle gas tank may also be utilized for dining. This is not an inclusive list but instead is merely an example list; other preselectable features for alternate destinations are also conceivable and are within the scope of the present invention.

Then the current location of the vehicle is determined (step 115) on the basis of the information regarding the movement status, the orientation, and the current position of the vehicle, this information being provided by sensors 30, 35, 40, namely rotational rate sensor 30, odometer 35, and GPS receiver 40. In addition, a trip route starting from the current position of the vehicle to the destination location preselected by the driver of the vehicle is determined with the assistance of the map information stored in memory 60. Finally, the navigation is performed through driving instructions output via output unit 50 on the basis of a comparison of the particular current position of the vehicle with the calculated trip route to guide the driver of the vehicle along the trip route. If the vehicle leaves the calculated trip route, the trip route is then recalculated in a conventional manner from the current position of the vehicle to the destination location preselected by the driver of the vehicle with appropriate navigation.

If the selected destination is reached in this way, there is a corresponding output to the driver of the vehicle (step 120), and the method according to the present invention is concluded (step 125).

During navigation, the signals of automotive sensors 70 and biosensors 75 are monitored continuously. If no deficiency is detected (step 130), the navigation is continued (step 115) in the manner described above.

However, if a deficiency is detected in the vehicle in step 130 on the basis of the signals of automotive sensors 70, e.g., the fuel level falling below a minimum supply level, where the term fuel is understood to include, for example, fuel for an internal combustion engine as the drive for the vehicle, a lubricant such as a lubricating oil required for the engine or a coolant to remove the heat generated in operation of the engine, the tire pressure dropping below a specified minimum pressure or acute or gradual damage to a device or module of the vehicle required for operation or any other device or module, or on the basis of biosensors 75, a deficiency which impairs the driver of the vehicle, in particular a health impairment in the driver himself, such as increased exhaustion or fatigue of the driver, excessive stress or other overstressing of the driver of the vehicle, or an impairment in the driver of the vehicle, which the driver himself reports to the navigation device by operating a corresponding button on operating unit 45, such as a need for food or liquid intake, a need for movement and/or a need for the driver to go to the bathroom, then the sequence goes to step 135.

There (step 135), an alternate destination having the facilities required to eliminate the deficiency ascertained and corresponding as much as possible to the preferences preselected by the driver of the vehicle is determined on the basis of the map information stored in memory 60. In addition, according to an embodiment of the present invention, the availability of the resources required to eliminate the deficiency is checked, e.g., by comparing the current time of day with official business hours of a gas station or a restaurant stored in memory 60 or by remote inquiry as to the availability of the resources at the alternate destination via wireless interface 80.

If such an alternate destination is not available (step 140), the search criterion is broadened for a renewed search for a suitable alternate destination (step 135), so that, for example, the preferences of the driver of the vehicle are disregarded incrementally in a new search. For example, in the case when it is necessary to refill the gas tank of the vehicle, the preselection of a certain petroleum company is disregarded first if no suitable alternate destination can be found, and in addition, the facility feature of a restaurant and so forth is disregarded in the search for alternate destinations.

Finally, if at least one alternate destination has been determined, the driver of the vehicle is notified of the alternate destination determined in step 135, or for the case when multiple suitable alternate destinations have been found which equally correspond or do not correspond to the predetermined preferences, the driver is provided with a list of the alternate destinations found via output unit 50 (step 150). As an alternative, it is also possible to provide for a plurality of alternate destinations determined to be output in a list, sorted according to the extent to which they meet the specified preferences.

If the prevailing deficiency has been detected by automotive sensors 70 or biosensors 75, the driver of the vehicle may be informed of the existence of this deficiency. This information may be provided either together with output at the alternate destination(s) determined (step 150) or immediately after detection of the deficiency. This avoids confusing the driver of the vehicle by navigation to an alternate destination different from the destination specified by the driver.

From the number of alternate destinations determined, the driver of the vehicle may select the alternate destination which appears most suitable or most appealing to him via operating unit 45 (step ass) or the driver may accept the only alternate destination determined. Therefore, the alternate destination(s) thus determined may be suggested to the driver for a specified period of time of one minute, for example, during which the driver of the vehicle may make an entry on operating unit 45 to select the alternate destination or one of the plurality of alternate destinations suggested to him.

Then (step 160; reached in the flow chart via jumping point 101) a check is performed to determine whether the driver of the vehicle has selected the alternate destination suggested or has selected one from the list of alternate destinations. If this is not the case, the sequence goes to step 165, where a check is performed to determine whether the deficiency found is a serious deficiency which would necessarily prevent continuation of the trip. Such a deficiency may be, for example, a flat tire, engine damage, a drop below the minimum levels of coolant or lubricant for functioning of the engine driving the vehicle, a decline in a fuel supply below a level that would make it possible to reach a more remote destination or alternate destination, or that the driver of the vehicle is falling asleep. If the deficiency found is such a serious deficiency, there is a corresponding notification of the driver of the vehicle (step 175) and the sequence is continued with the location determination, route calculation, and navigation described above with simultaneous monitoring of sensors 70 and 75 (step 115; via jumping point 102). As a result, the deficiency ignored by the driver of the vehicle is detected again in step 130 so that one or more alternate destinations are proposed again.

After the existence of a serious deficiency has been ascertained in step 165, it is possible according to an advantageous embodiment of the present invention for an alternate destination that has been suggested (step 150) or the alternate destination of a quantity of alternate destinations suggested having the greatest correspondence to preselected user preferences to be selected automatically, or in the case of multiple alternate destinations having the same correspondence with preselected user preferences, the alternate destination closest to the location of the vehicle to be selected automatically without the possibility of influence on the part of the driver of the vehicle (step 155).

Likewise, according to an advantageous embodiment of the present invention, in this situation as well as in the case of an initial offering of one alternate destination or multiple alternate destinations it is also possible for the alternate destination suggested or a preferred alternate destination from the list of alternate destinations suggested to be accepted or selected automatically after expiration of the preselected period of time provided in step 155 in the case of lack of confirmation or selection on the part of the driver of the vehicle. Then the driver of the vehicle has the opportunity to explicitly reject one or more alternate destinations suggested by making a corresponding input on the input unit. In addition, the driver of the vehicle also has the opportunity to select a destination other than the alternate destination from the list of alternate destinations suggested by making a corresponding entry on operating unit 45.

Redetermination of one or more alternate destinations in step 135 and if necessary also in steps 140 and 145 after rejection of an alternate destination due to, for example, input on the part of the driver of the vehicle rejecting that alternate destination or no input by the driver at all (step 155) is useful because the vehicle might have already passed one or more alternate destinations since the initial output of the alternate destinations and it is impossible to turn the vehicle around on the highway, for example; therefore, the alternate destinations that have been passed are not reachable before another alternate destination situated in the direction of travel.

If it is found in step 165 that the deficiency ascertained is not a serious deficiency so it does not necessarily prevent further driving, e.g., in the case of increased stress on the part of the driver, detected by biosensors 75, a need for food or fluid intake or the like entered by the driver of the vehicle himself via input unit 45, for example, controller 20 will either reset a corresponding user input or will ignore a sensor detecting the deficiency (step 170). The sequence is then continued with the navigation procedure according to step 155.

If it is found in step 160 that the user has confirmed an alternate destination suggested or has selected one of a plurality of alternate destinations, then the navigation destination preselected by the driver of the vehicle is stored temporarily in a buffer memory (not shown) and replaced by the selected or accepted alternate destination in the working memory of the controller (step 180). Then a new trip route from the current location of the vehicle to the trip destination now in effect, namely the selected or accepted alternate destination, is calculated and the navigation procedure toward this alternate destination is continued as described in conjunction with step 115 (step 185).

Once the alternate destination has been reached, there is a corresponding output via output unit 50 to the driver of the vehicle (step 190).

Then if the deficiency in the vehicle or the impairment of the driver of the vehicle is eliminated, e.g., by filling the gas tank of the vehicle in the case when the deficiency detected is when the minimum reserves of fuel have dropped too low (step 195), then a deficiency ascertained due to input by the driver, if necessary, is reset and the trip destination originally selected by the driver of the vehicle is loaded out of the buffer memory into the working memory of the navigation device (step 200), whereupon a re-calculation of the trip route from the current location of the vehicle, namely the alternate destination, to the trip destination is performed and the navigation procedure described above is continued (step 115; via jumping point 102).

If there is no alternate destination having the facilities necessary to eliminate a deficiency detected, memory 60 searches in vain for such an intermediate destination (step 135, 140, 145)—whether because the driver of the vehicle has ignored a suggested alternate destination or because he has failed to follow the driving instructions to the alternate destination and consequently the suggested alternate destination has been passed by without making use of the available facilities, or, whether because a corresponding alternate destination does not exist within the effective radius of the current location of the vehicle—then according to an advantageous embodiment of the present invention, a corresponding emergency call is sent to the nearest alternate destination having available facilities for elimination of the deficiency via a radio device (not shown in the figure) connected to navigation device 10. For example, if the vehicle stops for lack of fuel, the nearest gas station will be informed. This emergency call may be sent out automatically, e.g., when the vehicle comes to a standstill due to the deficiency not being eliminated, or the emergency call may be initiated by the driver of the vehicle, in which case the navigation device gives the driver of the vehicle a particular radio address from memory 60, for example.

As an alternative, after an intermediate destination has been ignored by the driver of the vehicle and when stoppage of the vehicle is immediately imminent, e.g., due to a decline in reserve fuel levels below a minimum reserve level, the driver of the vehicle is notified of the possibility of filling the tank from a reserve canister which is also provided and then the nearest gas station is selected as an alternate destination for further navigation.

What is claimed is:

1. A method of route calculation in a vehicle navigation device, comprising:
    calculating a route from one of a starting location and a current location to a destination location;
    detecting a deficiency impairing a driver of the vehicle; and
    if a deficiency is detected, calculating a route to an alternate destination location in place of the original destination location.

2. A method of navigation of a driver of a vehicle from a starting location to at least one destination location comprising:
    determining a trip route from one of the starting location and a current location to the at least one destination location;
    generating driving instructions as a function of a current location;
    detecting a deficiency impairing the driver of the vehicle; and
    if a deficiency is detected, calculating the trip route to an alternate destination.

3. A method of route calculation in a vehicle navigation device, comprising:
    calculating a route to a destination location from one of a starting location and a current location;
    detecting at least one of a deficiency in the vehicle and a deficiency impairing a driver of the vehicle;
    if a deficiency is detected, providing an alternate destination location to the driver of the vehicle; and
    recalculating a route using the provided alternate destination location in place of the destination location unless the driver of the vehicle rejects the alternate destination location;
    wherein the alternate destination location includes facilities for elimination of the deficiency in one of the vehicle and the driver of the vehicle.

4. A method of route calculation in a vehicle navigation device, comprising:
    calculating a route to a destination location from one of a starting location and a current location;
    detecting at least one of a deficiency in the vehicle and a deficiency impairing a driver of the vehicle;
    if a deficiency is detected, providing an alternate destination location to the driver of the vehicle; and
    recalculating a route using the provided alternate destination location in place of the destination location unless the driver of the vehicle rejects the alternate destination location;
    wherein the alternate destination has preselectable attribute.

5. The method of claim 1, further comprising:
    if a deficiency in one of the vehicle and the driver of the vehicle is detected, providing at least one alternate destination location to the driver of the vehicle.

6. The method of claim 5, further comprising:
    calculating the route to the selected alternate destination location instead of the destination location only after an alternate destination location has been accepted by the driver of the vehicle.

7. The method of claim 5, further comprising:
    calculating the route to the provided alternate destination location in place of the original destination location unless the driver of the vehicle rejects the alternate destination location.

8. A method of navigation of a driver of a vehicle from a starting location to at least one destination location, comprising:
    determining a trip route from one of the starting location and a current location to the at least one destination location;
    generating driving instructions as a function of the current location;
    detecting at least one of a deficiency in the vehicle or a deficiency impairing a driver of the vehicle;
    if a deficiency is detected, providing an alternate destination location to the driver of the vehicle; and
    calculating a route to the alternate destination location instead of the destination location unless the driver of the vehicle rejects the alternate destination location;
    wherein detection of a deficiency in one of the vehicle and the driver of the vehicle is performed by the driver of the vehicle.

9. The method of claim 1, further comprising:
    detecting a deficiency in the vehicle via sensors in the vehicle.

10. The method of claim 9, further comprising:
    checking availability of facilities at a potential alternate destination location for eliminating the deficiency in one the vehicle and the deficiency impairing the driver of the vehicle by comparing a current time of day with stored official business hours or by remote inquiry.

* * * * *

UNITED STATES PATENT AND TRADEMARK OFFICE
CERTIFICATE OF CORRECTION

PATENT NO. : 6,996,469 B2  Page 1 of 1
APPLICATION NO. : 10/258337
DATED : February 7, 2006
INVENTOR(S) : Lau et al.

It is certified that error appears in the above-identified patent and that said Letters Patent is hereby corrected as shown below:

On the Title page of the patent Item #(75), under the heading "Inventors", add inventor --Achim Schier--.

Signed and Sealed this

Second Day of October, 2007

JON W. DUDAS
*Director of the United States Patent and Trademark Office*